(12) United States Patent
Schmit et al.

(10) Patent No.: US 7,794,579 B2
(45) Date of Patent: Sep. 14, 2010

(54) PRODUCTION OF CHLORATES AND DERIVATIVE CHEMICALS FROM AMMONIUM PERCHLORATE

(75) Inventors: Steve J. Schmit, Ramsey, MN (US); Duane A. Goetsch, Andover, MN (US)

(73) Assignee: G.D.O., Elk River, MN (US)

( * ) Notice: Subject to any disclaimer, the term of this patent is extended or adjusted under 35 U.S.C. 154(b) by 565 days.

(21) Appl. No.: 11/974,366

(22) Filed: Oct. 12, 2007

(65) Prior Publication Data

US 2009/0114545 A1  May 7, 2009

Related U.S. Application Data

(60) Provisional application No. 60/851,657, filed on Oct. 13, 2006.

(51) Int. Cl.
 *C25B 1/26* (2006.01)
(52) U.S. Cl. .................. 205/500; 205/502; 205/503; 429/17; 423/475; 423/476
(58) Field of Classification Search ................. 205/500, 205/502, 503, 504, 505; 429/17; 423/475, 423/476

See application file for complete search history.

(56) References Cited

U.S. PATENT DOCUMENTS

| | | | | |
|---|---|---|---|---|
| 4,780,187 A | * | 10/1988 | Levy et al. | 204/242 |
| 2002/0028171 A1 | * | 3/2002 | Goetsch et al. | 423/237 |
| 2005/0037244 A1 | * | 2/2005 | Goetsch et al. | 429/17 |
| 2005/0211567 A1 | * | 9/2005 | Fleming | 205/500 |

* cited by examiner

*Primary Examiner*—Bruce F Bell
(74) *Attorney, Agent, or Firm*—Henry E. Naylor

(57) ABSTRACT

A process for the production of chlorates and derivative chemicals from ammonium perchlorate as a starting material. Ammonia is produced in a first step wherein a metal hydroxide is reacted with ammonium perchlorate to produce ammonia and a metal perchlorate. If the metal hydroxide used is sodium hydroxide, sodium perchlorate is formed. The ammonia generated is recovered and sent to a reformer to produce hydrogen which is used to fuel a fuel cell that generates water and electrical energy to run an electrochemical reactor where the metal perchlorate is converted to a metal chlorate and derivative chemicals.

23 Claims, 1 Drawing Sheet

PRODUCTION OF CHLORATES AND DERIVATIVE CHEMICALS FROM AMMONIUM PERCHLORATE

CROSS REFERENCE TO RELATED APPLICATIONS

This application is based on Provisional Application No. 60/851,657 filed Oct. 13, 2006.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A "MICROFICHE APPENDIX"

Not Applicable

BACKGROUND OF THE INVENTION

1. Field of the Invention

The present invention relates to a process for the production of chlorates and derivative chemicals from ammonium perchlorate as a starting material. Ammonia is produced in a first step wherein a metal hydroxide is reacted with ammonium perchlorate to produce ammonia and a metal perchlorate. If the metal hydroxide used is sodium hydroxide, sodium perchlorate is formed. The ammonia generated is recovered and sent to a reformer to produce hydrogen which is used to fuel a fuel cell that generates water and electrical energy to run an electrochemical reactor where the metal perchlorate is converted to a metal chlorate and derivative chemicals.

2. Description of Related Art

The perchlorate anion ($ClO_4^-$) has been found in water supplies throughout the southwestern United States. The primary source of this perchlorate is from the release of ammonium perchlorate to the environment. The primary use of ammonium perchlorate is as a propellant which generates controlled propulsion of a rocket or projectile during flight. Ammonium perchlorate, as a solid fuel for rocket motors, is ideal for military applications since it is stable, can be stored almost indefinitely, and is denser than liquid fuels yielding more compact systems. In fact, the space shuttle is the largest consumer of ammonium perchlorate in which each set of space shuttle solid rocket motors use approximately 1.7 million pounds of the propellant. The other large user of ammonium perchlorate is the U.S. military in which the propellant is used in virtually every solid-fueled tactical and strategic missile in the inventory. In 1998, the EPA added perchlorate to the Contaminated Candidate List for drinking water. Currently the EPA is overseeing the clean-up of a variety of contaminated sites in states such as Nevada, California, Arizona, and Texas. From a health standpoint the perchlorate ion, which is similar in size to the iodide ion, can be taken up by the mammalian thyroid gland. As a result, the perchlorate ion can disrupt the production of thyroid hormones and hence disrupt metabolism. Therefore, there is a need for processes that are able to reduce the amount of perchlorate introduced into the environment.

This invention addresses the perchlorate problem from a demilitarization standpoint. The United States Department of Defense maintains that there are no feasible technologies available to completely address the perchlorate problem through the chemical processing of ammonium perchlorate. Current demilitarization practices only recover and reuse the perchlorate without any attempt to convert it to any other chemical moiety. This invention relates to a chemical process by which ammonium perchlorate, recovered from weapons systems, can be chemically converted to commodity chemicals and used commercially. This approach completes the life cycle of a weapons systems in which an environmentally unfriendly chemical is converted to chemicals that have significant commercial value.

SUMMARY OF THE INVENTION

In accordance with the present invention there is provided a process for producing chlorates and derivative chemicals from ammonium perchlorate, which process comprises:

a) introducing an effective amount of an aqueous solution of ammonium perchlorate and an effective amount of an aqueous caustic solution into a reaction zone, which caustic is represented by MOH, wherein M is selected from the group consisting of Li, Na and K;

b) reacting said ammonium perchlorate and MOH in said reaction zone at effective reaction conditions to produce an ammonia product stream and a product stream containing M-perchlorate;

c) reforming the ammonia in a reforming zone to produce a hydrogen-containing product stream;

d) introducing at least a portion of said hydrogen-containing product stream in said reforming zone to a fuel cell, wherein the electrical energy generated by the fuel cell is used to power an electrochemical reaction zone containing a cathode and an anode;

e) reacting the M-perchlorate in said electrochemical reaction zone to produce oxygen at the anode and at the cathode a product stream containing M-chlorate and at least one other product selected from the group consisting of M-chlorite, M-hypochlorite, and M-chloride; and f) collecting the M-chlorate and derivate chemicals produced in said electrochemical reaction zone.

In a preferred embodiment the caustic is NaOH.

In another preferred embodiment at least a portion of the oxygen produced in the electrochemical reaction zone is conducted to said fuel cell.

BRIEF DESCRIPTION OF THE FIGURE

The sole FIGURE hereof is a simplified flow scheme of a preferred embodiment of the present invention for producing a metal chlorate from ammonium perchlorate by a three step process.

DETAILED DESCRIPTION OF THE INVENTION

Figure 1:
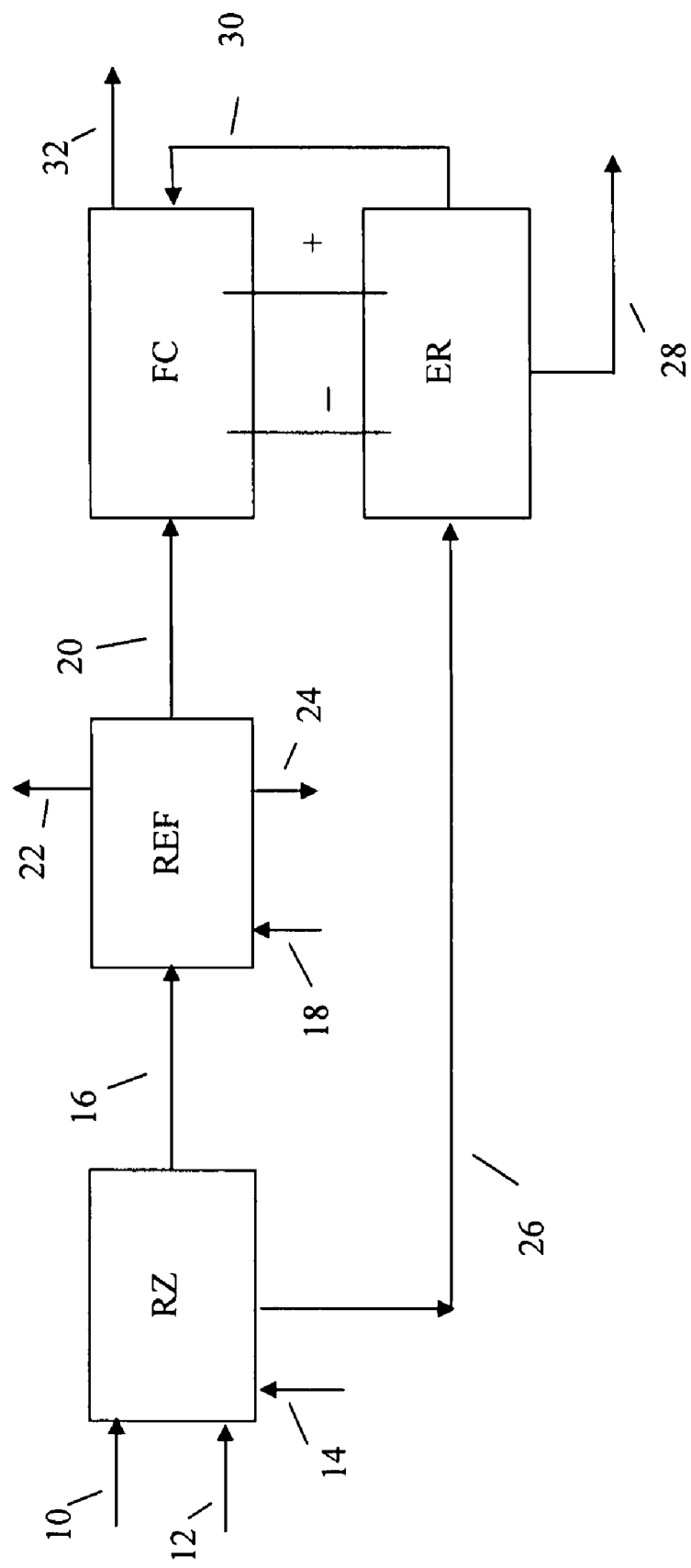

As previously mentioned, the perchlorate ion is a harmful contaminant in the environment. It is typically released into the environment primarily by way of improper disposal of ammonium perchlorate that is used as a solid propellant for such things as rockets, missiles and fireworks. Conventional demilitarization processes are not able to achieve the destruction efficiencies to meet perchlorate levels adopted by EPA of 24 ppb in drinking water. The process of the present invention is capable of meeting those levels as well as generating energy.

The FIGURE hereof is a simplified representation of a preferred process scheme for practicing the present invention.

Ammonium perchlorate is conducted into a reaction zone RZ via line 10. It is preferred that the ammonium perchlorate be used as an aqueous solution of suitable molarity and that the ratio of caustic to ammonium perchlorate in reaction zone RZ be from about stoichiometric to excess caustic, more preferably about stoichimetric. Effective molarities of aqueous ammonium perchlorate range from 0.01 to 10 mol/L, preferably from about 0.1 to 3.0 mol/L, depending upon temperature. Effective temperatures range from about 0° to 100° C., preferably from about 0° to about 60° C. An effective amount of caustic (MOH, where M is selected from Li, Na, and K) is also conducted into reaction zone RZ via line 12 where hydrolysis takes. The caustic converts the ammonium ion from the ammonium perchlorate to ammonia gas. Also, the M cation that is introduced into reaction zone RZ via the caustic takes the place of the ammonium ion in solution with the formation of M-perchlorate. Aqueous or solid caustic can be introduced to reaction zone RZ. The reaction zone RZ may be heated to enhance the rate of ammonia gas generation and recovery. As a result, the addition of solid caustic to reaction zone RZ is beneficial in that the exothermic heat of solution can be used to heat the reactor of reaction zone RZ.

In this invention, the processing of 45.4 kilograms of ammonium perchlorate, requires 15.4 kilograms of sodium hydroxide for the generation of a stoichiometric mixture in reaction zone RZ. The hydrolysis reactor generates about 6.8 kilograms of additional water, about 6.8 kilograms of ammonia, and about 47.2 kilograms of sodium perchlorate. Next, the recovered ammonia is used to produce hydrogen.

As previously mentioned, reaction zone RZ is one in which hydrolysis of ammonium perchlorate in the presence of a caustic generates a product stream comprised of gaseous ammonia and a product stream comprised of M-perchlorate. The ammonia gas product stream is conducted, via line 16, and an oxygen-containing gas, preferably air via line 18, to reformer REF where a hydrogen product stream is produced, which hydrogen product stream is conduced to fuel cell FC via line 20. Reformer REF is preferably one wherein the autothermal ammonia reformation occurs. Conducting the ammonia decomposition reaction under such autothermic conditions leads to higher conversions of ammonia and to higher hydrogen selectivities. An autothermic state is achieved in which no heat need be added to the reaction system. Performance can further be enhanced through the independent supply of heat to the reaction system or recovery and reuse of heat generated within the reactor. Any catalyst can be used that is capable of decomposing ammonia to produce a hydrogen Preferred catalysts include the transition metals, such as those selected from the group consisting of Groups IIIA (Sc, Y, La), IVA (Ti, Zr, Hf), VA (V, Nb, Ta), VIA (Cr, Mo, W), VIIA (Mn, Re), VIIIA (Fe, Co, Ni, etc.), IB (Cu, Ag, Au), and IIB (Zn, Cd, Hg) of the Periodic Table of the Elements, inclusive of mixtures and alloys thereof. Preferred are the metals from Groups VIA, VIIA, and VIIIA, particularly Fe, Ni, Co, Cr, Mn, Pt, Pd, and Ru. Also included as suitable ammonia decomposition catalysts are those disclosed in U.S. Pat. No. 5,976,723, which is incorporated herein by reference. The catalysts of U.S. Pat. No. 5,976,723 are comprised of: a) alloys having the general formula $Zr_{1-x}Ti_xM_1M_2$ wherein $M_1$ and $M_2$ are selected independently from the group consisting of chromium, manganese, iron, cobalt, and nickel and x is in the range from about 0.0 to 1.0 inclusive, and b) between about 20% by weight and about 50 by weight of aluminum.

The ammonia decomposition catalyst used in the practice of the present invention may be either supported and non-supported. A preferred non-supported catalyst would be a pure metallic woven mesh, more preferably a nickel woven mesh. It is preferred that the catalyst be supported on any suitable support. Preferred support structures include monoliths, fiber mats, and refractory inorganic particles. The supports will preferably be comprised of carbon or a metal oxide, such as alumina, silica, silica-alumina, titania, magnesia, aluminum metasilicates, and the like. The second type of preferred material for the catalyst support structures suitable for use herein are the heat- and oxidation-resistant metals, such as stainless steel or the like. Also suitable are materials known as Fecralloys that can withstand high temperatures, can be wash-coated, and can also form an alumina layer (oxide layer) on its surface that can be used to not only support a metal catalyst but that also can act as a thermal insulating material.

Autothermal ammonia decomposition provides an especially effective way to supply hydrogen for use in the proton exchange membrane (PEM) fuel cell system. This technique combines endothermic heterogeneous ammonia decomposition reaction, into hydrogen and nitrogen on a supported catalyst, with the exothermic homogenous oxidation of ammonia (into nitrogen and water) in the gas phase. This direct coupling of ammonia dissociation and oxidation within the same reactor greatly improves heat transfer and process energetics. It is preferred that the reformer approach adiabatic operation with cooling of the reactor effluent via feed gas preheat in a suitable heat exchanger. The reformer will be operated at a temperature of about 200° C. to about 2000° C., preferably from about 400° C. to about 1500° C. and at ammonia to oxygen mol ratios of about 3 to 20, preferably from about 4 to 10, more preferably from about 7 to 8. The resulting observed ammonia conversions are in excess of 99%.

The product from the ammonia reformer is hydrogen, nitrogen, and water. At least a portion of the hydrogen and optionally at least a portion of the nitrogen are conducted to proton exchange membrane (PEM) fuel cell FC via line 20. At least a portion of nitrogen can also be vented to the atmosphere via line 22 and water removed from the reformer via line 24. It will be understood that before entering the fuel cell FC the hydrogen-containing stream 20 will need to be cooled to the operating temperature range of the fuel cell. Residual amounts (ppm levels) of ammonia may be present in the hydrogen/nitrogen product stream. A scrubber (not shown) can be used upstream of fuel cell FC to reduce the amount of residual ammonia to acceptable levels for the PEM fuel cell.

For a fuel cell, such as a PEM fuel cell, with an overall energy density based on the mass of ammonia of 1.5 Watt hours per gram, the processing of the 6.8 kilograms of ammonia generates 35,000 kilojoules of electrical energy of which a portion is used to electrochemically reduce the perchlorate anion is the next step.

At least a portion of the M-perchlorate product stream from the reaction zone RZ will be conducted to electrochemical reactor ER, via line 26, wherein M-perchlorate is reduced to M-chlorate and derivate chemicals with the generation of oxygen in an aqueous solution. The M-chlorate is collected via line 28 and a portion of the oxygen is optionally conducted via line 30 to the fuel cell FC which generates an electrical current and water as a by-product, which can be discharged via line 32.

The perchlorate anion reduction process takes the chlorine atom from the +7 oxidation state to +5 when reduced to chlorate. The standard reduction potential is 1.194 Volts and occurs at the cathode of the electrochemical reactor. The oxidation of water occurs at the anode of the electrochemical reactor; this half-cell reaction has a standard potential of −1.229 Volts. As a result, the overall cell potential is −0.035 Volts. Since the cell potentials are related to the Gibbs free energy of formation by Faraday's Laws of Electrolysis, the Gibbs free energy change is 6.76 kiloJoules/mol. Therefore, 2,600 kilojoules of energy are required to electrochemically reduce the perchlorate from 47.2 kilograms of sodium perchlorate. However, 35,000 kilojoules of electrical energy is generated in the fuel cell FC through the processing of the 6.8 kilograms of ammonia generated in reaction zone RZ. During the course of the electrochemical reduction process, the 47.2 kilograms of sodium perchlorate, for example, yields 6.4 kilograms of oxygen and 40.8 kilograms of sodium chlorate. This invention utilizes the internal energy of ammonia obtained by autothermally reforming ammonia and powering a fuel cell, to provide the energy needed to power electrochemical reactor ER where the reduction of perchlorate occurs.

The electrochemical reactor ER will preferably not be operated at standard conditions since concentrations of perchlorate are typically not at 1 mol/L. Effective molarities of the aqueous ammonium perchlorate range from about 0.1 to 10 mol/L depending upon temperature which as previously mentioned is in the range of about 0° to 100° C. Since electrochemical reactor ER does not operate at standard conditions, a significant overpotential is required when powering electrochemical reactor ER. Fortunately, fuel cell FC can generate a great excess of energy that meets overpotential requirements. In addition, any excess electrical energy from fuel cell FC can be used to power other equipment in the process such as pumps.

The perchlorate anion is reduced in the electrochemical reaction zone. The perchlorate anion is comprised of a tetrahedral array of oxygen atoms bonded to a central chlorine atom. Since the chlorine atom is in the +7 oxidation state, the perchlorate anion is a strong oxidizing agent. In addition, the reduction of perchlorate ($ClO_4^-$) in electrochemical reactor ER can further reduce the oxidation state of the chlorine from +7 to not only +5, but also to +3, +1, and −1. As a result, other derivative chemicals aside from chlorate ($ClO_3^-$) are produced. Such other derivative chemicals include chlorite ($ClO_2^-$), hypochlorite ($ClO^-$), and chloride ($Cl^-$). The production of these derivative chemicals requires additional energy of which some or all can be provided by fuel cell FC.

Perchlorate reduction is non-labile and exhibits low reactivity. These properties of perchlorate led to its extensive use as a propellant. Fortunately, the nonliable and low reactive nature of perchlorate is due to kinetic effects since the reduction process is thermodynamically favored. As a result, catalytic materials are used to reduce the rather large activation energy associated with perchlorate reduction. The use of catalytic materials can take the form of electrode materials used in electrochemical reactor ER or the addition of metal particles to the aqueous solution in the electrochemical reactor itself. These materials can include any materials used in traditional electrochemical reactors. These materials include, but are not limited to, platinum, tin, ruthenium, iridium, vanadium, titanium, and graphite.

Overall, this invention describes a process in which the controlled chemical conversion of ammonium perchlorate to derivative chemicals is achieved. When ammonium perchlorate is used as a propellant, the perchlorate ion rapidly oxidizes the ammonium ion releasing large amounts of energy in an uncontrolled fashion. In this invention, the ammonium ion is recovered from ammonium perchlorate through a hydrolysis reaction conducted in reaction zone RZ. This ammonia is then oxidized in a controlled fashion in reformer REF to generate hydrogen for fuel cell FC. This fuel cell then powers the electrochemical reactor ER where the controlled reduction of perchlorate occurs.

What is claimed:

1. A process for producing chlorates and derivative chemicals from ammonium perchlorate, which process comprises:
   a) introducing an effective amount of an aqueous ammonium perchlorate solution and an effective amount of an aqueous caustic solution into a reaction zone, which caustic is represented by MOH, wherein M is selected from the group consisting of Li, Na and K;
   b) reacting said ammonium perchlorate and MOH in said reaction zone at effective reaction conditions to produce an ammonia product stream and a product stream containing M-perchlorate;
   c) reforming the ammonia in a reforming zone in the presence of a reforming catalyst and an oxygen-containing gas to produce a hydrogen-containing product stream;
   d) introducing at least a portion of said hydrogen-containing product stream to a fuel cell, wherein the electrical energy generated by the fuel cell is used to power an electrochemical reaction zone containing a cathode and an anode;
   e) reacting the M-perchlorate in said electrochemical reaction zone to produce oxygen at the anode and at the cathode a product stream containing M-chlorate and at least one other product selected from the group consisting of M-chlorite, M-hypochlorite, and M-chloride; and
   f) collecting the M-chlorate and derivate chemicals produced in said electrochemical reaction zone.

2. The process of claim 1 wherein MOH is NaOH.

3. The process of claim 1 wherein the molarity of the aqueous ammonia perchlorate solution is from about 0.01 to about 10 mol/L.

4. The process of claim 3 wherein the temperature of the aqueous ammonia perchlorate solution is from about 0° to about 100° C.

5. The process of claim 4 wherein the molarity of the aqueous ammonia perchlorate solution is from about 0.1 to about 3 mol/L and at a temperature of about 0° to about 60° C.

6. The process of claim 2 wherein the molarity of the aqueous ammonia perchlorate solution is from about 0.1 to about 3 mol/L and at a temperature of about 0° to about 60° C.

7. The process of claim 1 wherein the reforming catalyst is supported or unsupported and contains a metal selected from Groups IIIA, IVA, VA, VIA, VIIA, VIIIA, IB, and IIB of the periodic table of the elements.

8. The process of claim 7 wherein the reforming catalyst contains a metal selected from Groups VIA, VIIA, and VIIIA of the periodic table of the elements.

9. The process of claim 8 wherein the reforming catalyst is supported on a refractory inorganic support and contains a metal selected from Fe, Ni, Co, Cr, Mn, Pt, Pd, and Ru.

10. The process of claim 9 wherein the support is selected from the group consisting of carbon, alumina, silica, silica-alumina, titania, magnesia, and alumina silicates.

11. The process of claim 6 wherein the reforming catalyst is supported on a refractory inorganic support and contains a metal selected from Fe, Ni, Co, Cr, Mn, Pt, Pd, and Ru, wherein the support is selected from the group consisting of carbon, alumina, silica, silica-alumina, titania, magnesia, and alumina silicates.

12. The process of claim 11 wherein the reforming zone is operated at a temperature from about 400 to 1500° C.

13. The process of claim 12 wherein the ratio of ammonia to oxygen in the reforming zone is from about 4 to about 10.

14. The process of claim 1 wherein the temperature of the reforming zone is from about 200° to about 2000° C.

15. The process of claim 14 wherein the temperature of the reforming zone is from about 400° to about 1500° C.

16. The process of claim 1 wherein the mol ratio of ammonia to oxygen in the reforming zone is from about 3 to about 20.

17. The process of claim 16 wherein the mol ratio of ammonia to oxygen is from about 4 to 10.

18. The process of claim 1 wherein at least a portion of the oxygen produced in the electrochemical reaction zone is conducted to the fuel cell.

19. A process for producing chlorates and derivative chemicals from ammonium perchlorate, which process comprises:
   a) introducing an effective amount of an aqueous ammonium perchlorate solution and an effective amount of NaOH;
   b) reacting said ammonium perchlorate and NaOH in said reaction zone at effective reaction conditions to produce an ammonia product stream and a product stream containing sodium perchlorate;
   c) reforming the ammonia in a reforming zone in the presence of a reforming catalyst and an oxygen-containing gas, wherein the mol ratio of ammonia to oxygen is from about 3 to 20 at reaction temperatures from about 200° to 2000° C., thereby producing a hydrogen-containing product stream;
   d) introducing at least a portion of said hydrogen-containing product stream to a fuel cell, wherein the electrical energy generated by the fuel cell is used to power an electrochemical reaction zone containing a cathode and an anode;
   e) reacting the sodium perchlorate in said electrochemical reaction zone to produce oxygen at the anode and at the cathode a product stream containing sodium chlorate and at least one other product selected from the group consisting of sodium chlorite, sodium hypochlorite, and sodium chloride; and
   f) collecting the M-chlorate and derivate chemicals produced in said electrochemical reaction zone.

20. The process of claim 18 wherein the molarity of the aqueous ammonia perchlorate solution is from about 0.1 to about 3 mol/L and at a temperature of about 0° to about 60° C.

21. The process of claim 19 wherein the reforming catalyst is supported on a refractory inorganic support and contains a metal selected from Fe, Ni, Co, Cr, Mn, Pt, Pd, and Ru.

22. The process of claim 20 wherein the support is selected from the group consisting of carbon, alumina, silica, silica-alumina, titania, magnesia, and alumina silicates.

23. The process of claim 21 wherein the reforming zone is operated at a temperature from about 400° to 1500° C. and an ammonia to oxygen mol ratio from about 4 to about 10.

* * * * *